May 9, 1944.　　　W. T. CARDWELL, JR　　　2,348,520
SUSPENDOMETER
Filed June 5, 1942

INVENTOR
William T. Cardwell Jr.
By
ATTORNEY

Patented May 9, 1944

2,348,520

UNITED STATES PATENT OFFICE 2,348,520

SUSPENDOMETER

William T. Cardwell, Jr., Whittier, Calif., assignor to Standard Oil Company of California, San Francisco, Calif., a corporation of Delaware Application June 5, 1942, Serial No. 445,942

6 Claims. (Cl. 265—44)

This invention relates to an apparatus for measuring the relative capacities of fluids, such as well drilling fluids, to suspend small fragments of rock, weighting material, sand and the like.

Heretofore various methods have been used to obtain an indirect indication of the property of a slurry, such as a suspension of clay in water that is used in deep well drilling, to suspend drill cuttings, weight materials and the like, these methods including the determination of apparent viscosities, by measuring the time during which a given quantity flows through a funnel or orifice and the estimation of so-called shear strength by noting the distance a light strip of metal or a metal tube will sink into a quiescent body of the fluid in question. These measurements have not given directly an indication of the size of particles which may be suspended and this invention comprehends broadly a determination of this latter property by introducing a plurality of solid bodies of graduated sizes into a body of quiescent fluid, releasing them to sink through said fluid during a given time interval, and then collecting those which have sunk through different distances in the fluid. In this manner the capacity of a given fluid for suspending the rock cuttings and the like may be determined directly and with a minimum of equipment so that addition of corrective materials, such as colloids and the like, may be made at proper intervals, thus keeping the fluid at its maximum operating efficiency.

It is an object of this invention to provide a relatively simple device which may be used by unskilled labor to determine the suspending properties of a slurry, such as a well drilling fluid.

Another object is to provide a simple and economical apparatus which has a minimum of moving parts and critical dimensions and whose operation is readily checked.

Another object is to provide a device of this nature which may be immersed in a sample of the fluid to be tested and requires no accessory equipment except a means for measuring a predetermined time interval.

These and other objects and advantages of this invention will be further apparent from the following description and from the appended drawing which forms a part of this specification and illustrates a preferred embodiment of the invention.

As stated above, this invention comprehends broadly means for initially suspending or introducing a plurality of solid bodies of graduated sizes and predetermined density in quiescent body of the fluid whose suspending powers are to be determined, these means being adapted to be actuated or withdrawn to permit the graduated bodies to sink in the fluid for a predetermined period of time, after which means are introduced into the paths of the bodies to intercept and segregate them according to the distance which they have moved through the body of the fluid.

Figure 1:
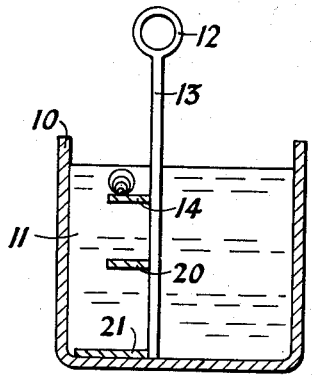
Figure 1 is a vertical sectional diagrammatic view of a simple form of this invention in place in a container of the fluid which is to be tested and shows the test bodies suspended in the upper portion of the fluid.
Figure 2:
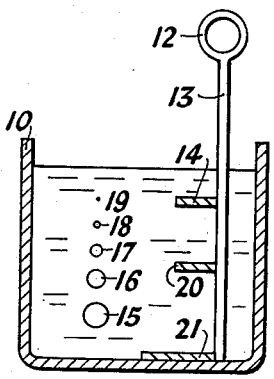
Figure 2 is a vertical sectional diagrammatic view of the apparatus of Figure 1 in which the suspending means have been withdrawn, leaving the solid bodies to sink in the fluid.

Referring to the drawing and particularly to Figure 1, reference numeral 10 designates any suitable container for the fluid 11 which is to be tested, the fluid being permitted to remain quiescent in container 10 for a predetermined time, depending in some cases upon the gelling or thixotropic properties of the fluid. The suspendometer, generally designated 12, which may consist of a suitable vertical handle 13 and a transverse shelf or ledge 14 is adapted to support a plurality of solid bodies 15, 16, 17, 18 and 19 which may be glass or metal spheres or cubes or other conformations of appropriate density and having graduated sizes, for example $5/100$, $1/10$, $2/10$, $3/10$ and $4/10$ of an inch. In this example the largest body is designated 15 and the smallest 19. Suspendometer 12 is introduced into the fluid 11 in container 10 to a predetermined distance which may be limited by the length of handle 13 and, after the fluid has become quiescent, the handle 13 is moved quickly toward the right, leaving bodies 15 to 19 to sink in fluid 11 under the action of gravity and against the resistance afforded by the viscosity, density and other factors which are characteristic of the fluid to be tested.

Figure 3:
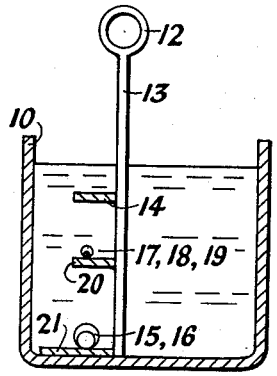
Figure 3 is a vertical sectional diagrammatic view similar to Figures 1 and 2 and illustrates an intercepting means moved back into the path of the sinking bodies in the fluid.

Desirably, handle 13 is provided with two or more intercepting means 20 and 21 vertically spaced below the transverse shelf means 14. Any or all of the three means may desirably consist of a shelf or ledge of sheet metal or metal screen. After a predetermined time interval, for example 15 minutes, the intercepting means 20 and 21 are moved quickly to the left as in Figure 3, thus intercepting the sinking bodies 15 to 19 and segregating the latter according to the distance through which they have traveled in fluid 11. The smaller bodies, for example 18 and 19, may be retained or intercepted by the upper intercepting plate or screen 20 while the larger diameter and more massive bodies 15 and 16 will have traveled through a greater distance and will thus be intercepted by the lower means 21. The location of the bodies may be determined by lifting the upper and lower intercepting means 20 and 21 out of fluid 11 by means of handle 13. In this example handle 13 is illustrated as connecting the upper and lower intercepting means 20 and 21 and also the supporting shelf 14. Obviously, various other arrangements could be made without departing from the essential functions of these means as described above.

Figure 4:
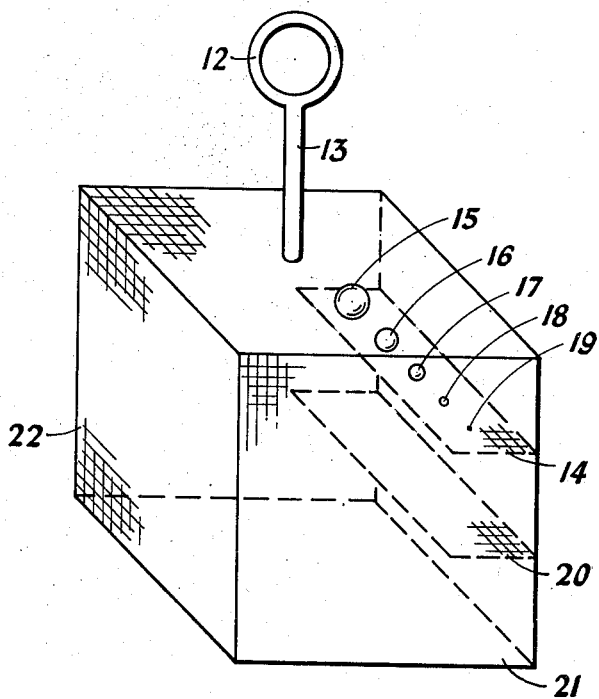
Figure 4 is a diagrammatic perspective view of one embodiment of this invention showing the body suspending and intercepting means built into a cage or container for the test bodies.

Figure 4 illustrates a preferred embodiment of this invention in which a reticulated container 22 is used, the openings being small enough to retain the smallest test body 19 but still large enough to permit motion of the container through the fluid without unduly agitating the latter. In this example, the body supporting means 14 may consist of a shelf secured to one side of the rectangular container 22, intercepting means 20 being a similar shelf spaced below shelf 14 and the lowest intercepting means 21 comprising the bottom of container 22. In this example container 22 is illustrated as being entirely closed, the handle 13 being secured to the top as shown in Figure 4. This is desirable to prevent loss of the graduated size bodies 15 to 19, etc., during the testing operation and also during the washing of the bodies which normally follows each test. Provision of a top is not required if care is taken to retain the bodies within container 22.

From the foregoing description it will be apparent that an improved form of apparatus has been disclosed for measuring or at least comparing the suspending properties of various slurries or suspensions of materials such as are used for drilling fluids. The apparatus disclosed generally comprises means for initially supporting a plurality of bodies of predetermined graduated sizes at substantially the same level in a quiescent body of the fluid. The support is adapted to be actuated or withdrawn to release the bodies so that they may sink through the fluid during a predetermined time interval, the distance traveled being dependent upon the suspending properties of the fluid for the respective particles involved. Means are provided which may be spaced at predetermined vertical distances below the starting point of the bodies or particles to intercept the latter so that they may be segregated according to size or mass. Although specific examples of this invention are given, it is obvious that numerous changes could be made without departing from its essential features and all such modifications and changes that come within the scope of the appended claims are embraced thereby.

I claim:

1. A suspendometer for comparing the relative capacities of fluids, such as well drilling fluids, to support rock fragments, weight material, sand and the like, comprising a plurality of solid bodies of graduated sizes and uniform density, means for initially supporting said bodies in a quiescent body of said fluid, said support means adapted to be withdrawn laterally to release said bodies so that they are free to sink through said fluid, and means having a plurality of vertically spaced ledges adapted to be introduced laterally into the path of said falling bodies to intercept and segregate bodies that have traveled different distances through said fluid during a given time interval.

2. A suspendometer according to claim 1 with the addition of a reticulated container for said bodies, said first and second named means being positioned within said container.

3. A suspendometer according to claim 1 with the addition of reticulated means connecting said support means and said intercepting means, whereby all of said means may be moved through said fluid with a minimum of disturbance thereto.

4. A suspendometer of the type described comprising a container having a closed bottom portion, a plurality of solid bodies of graduated sizes and uniform density in said container, means for supporting said bodies near the top of said container, and a plurality of vertically spaced ledges in said container intermediate said supporting means and the bottom of said container for intercepting one or more of said bodies, said container being at least partially reticulated and adapted to retain the smallest of said bodies.

5. A suspendometer ccording to claim 4, in which said container entirely encloses said means and said bodies, to prevent loss of the latter.

6. A suspendometer for comparing the relative capacities of fluids, such as well drilling fluids, to support rock fragments, weight material, sand and the like, comprising a plurality of solid bodies of graduated sizes and uniform density, means for initially supporting said bodies in a quiescent body of said fluid, said support means adapted to be actuated to release said bodies so that they are free to sink through said fluid, and a plurality of vertically spaced intercepting means adapted to be introduced into the paths of said sinking bodies to intercept and segregate those which have traveled different distances through said fluid during a given time interval.

WILLIAM T. CARDWELL, Jr.